United States Patent [19]

Mackelvie

[11] 3,888,140
[45] June 10, 1975

[54] INDEXING TURRET

[75] Inventor: Philip A. Mackelvie, Commerce City, Colo.

[73] Assignee: Multi-Point Tool Co., Inc., Commerce City, Colo.

[22] Filed: Apr. 15, 1974

[21] Appl. No.: 461,004

[52] U.S. Cl. .................... 74/826; 74/817; 74/821; 74/822
[51] Int. Cl. ............................................ B23b 29/32
[58] Field of Search .......... 74/826, 815, 813 L, 824; 82/36 A

[56] References Cited
UNITED STATES PATENTS

| | | | |
|---|---|---|---|
| 2,940,341 | 6/1960 | Diener | 74/824 |
| 3,545,317 | 12/1970 | Shultz et al. | 74/826 X |
| 3,628,400 | 12/1971 | Chope et al. | 74/826 |

*Primary Examiner*—Benjamin W. Wyche
*Assistant Examiner*—F. D. Shoemaker
*Attorney, Agent, or Firm*—Sheridan, Ross & Fields

[57] ABSTRACT

The turret comprises a supporting base and an indexing head mounted on the base for extension and retraction away from and toward the base and for rotation with respect to the base. A first rotary actuator is mounted on the base and threadedly carries a lift stud which is rotatably connected to the head. A series of interengaging indexing lock members hold the head in one of several indexed positions when the head is retracted. When it is extended, the lock members disengage to allow the head to turn to the next indexed position. Rotation of the first rotary actuator in advancing and retracting directions positively extends and retracts the lift stud and the head. A rotary drive shaft connected to the first rotary actuator is connected through a second rotary actuator to the head with lost motion to rotate the head to the next indexed position during the last portion of rotation of the first rotary actuator when the indexing lock members are disengaged.

13 Claims, 6 Drawing Figures

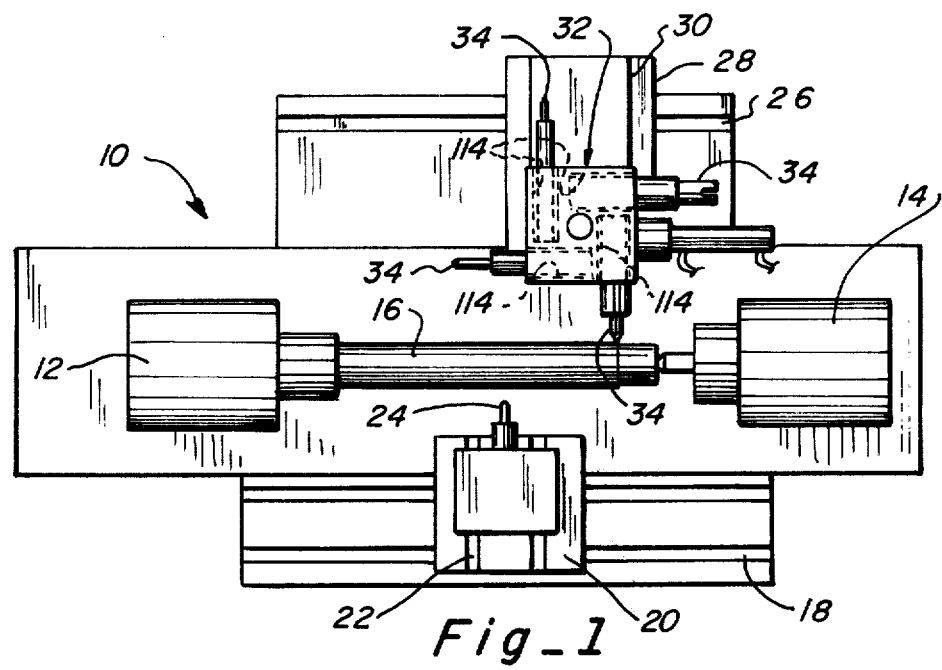
Fig_1
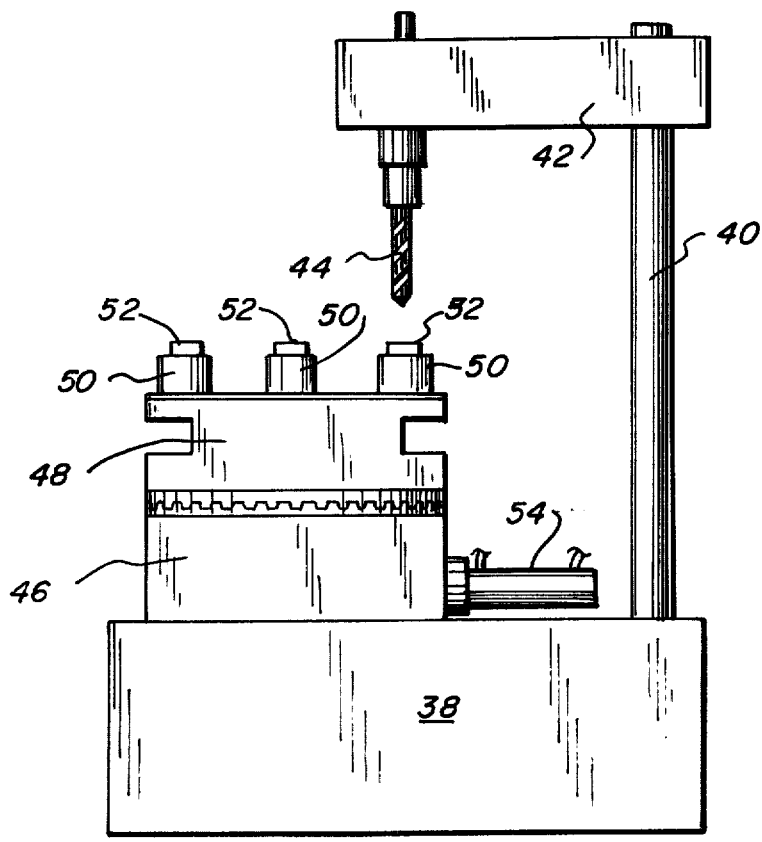
Fig_2

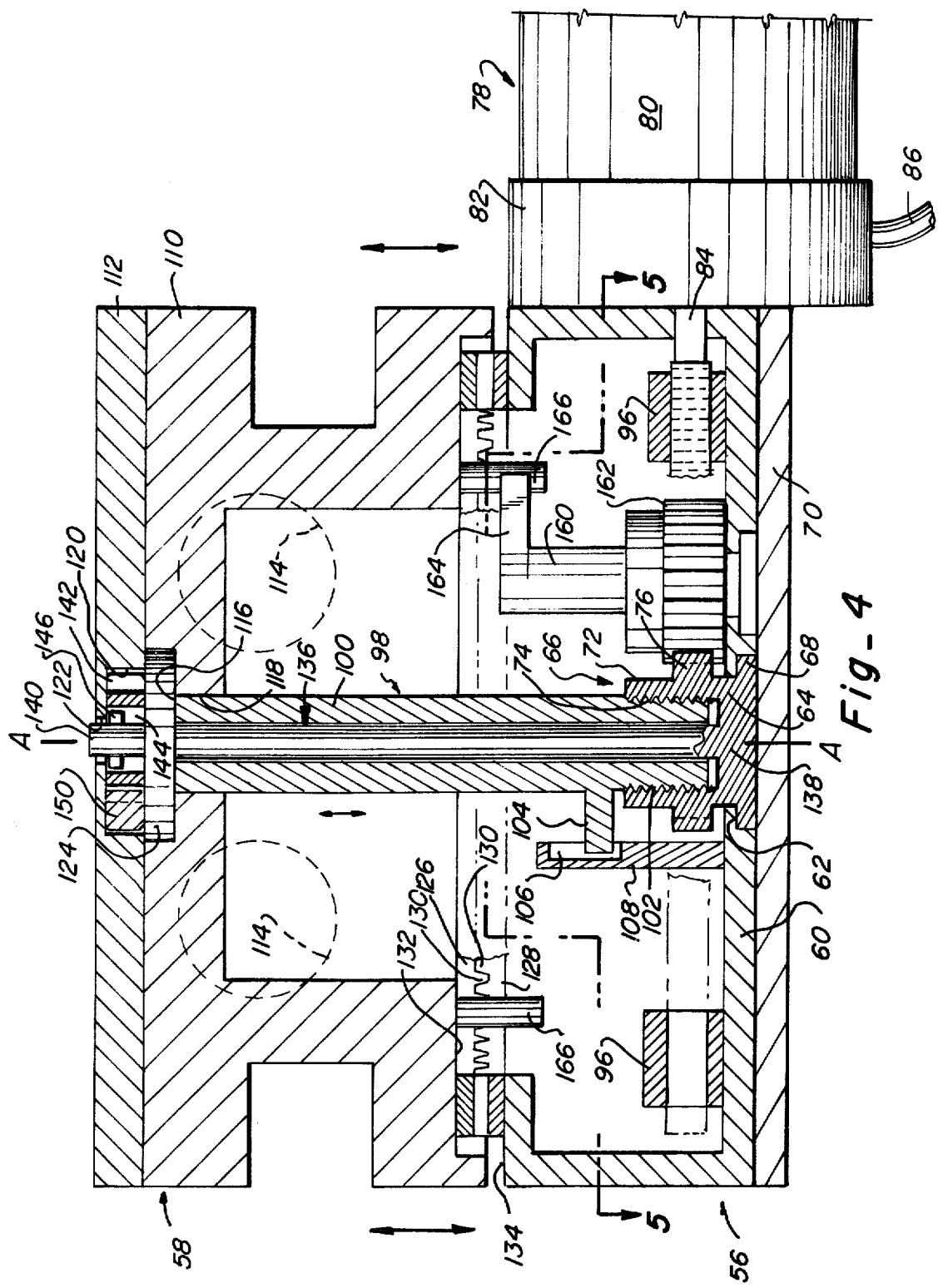

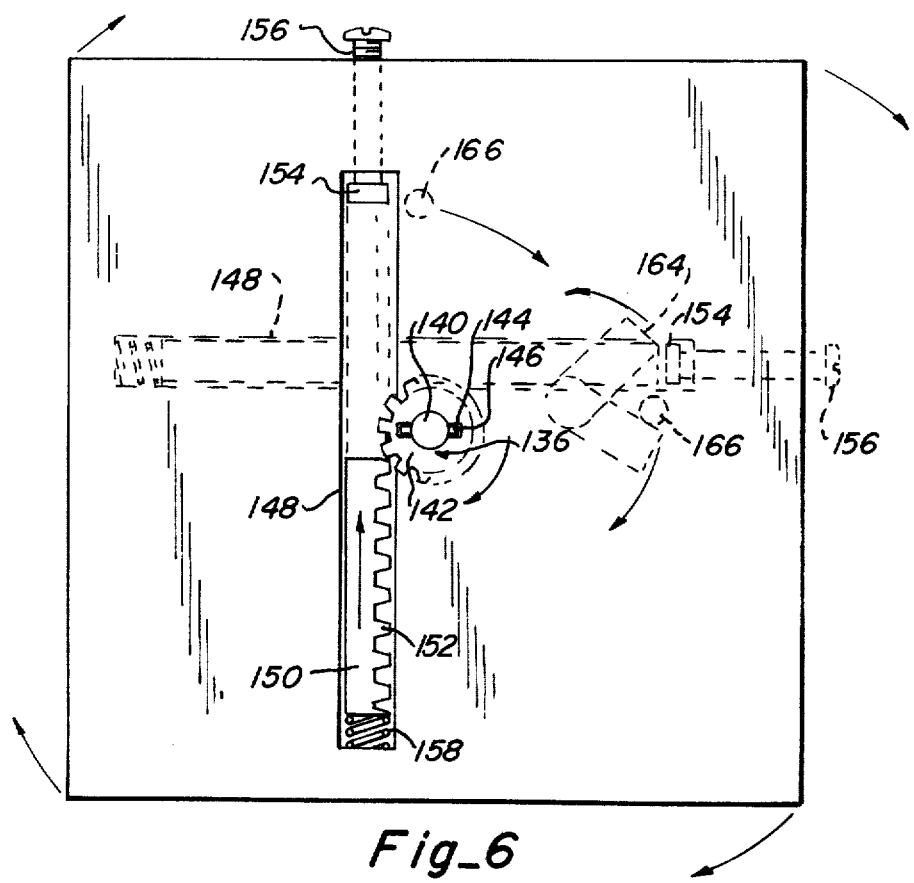
Fig_6
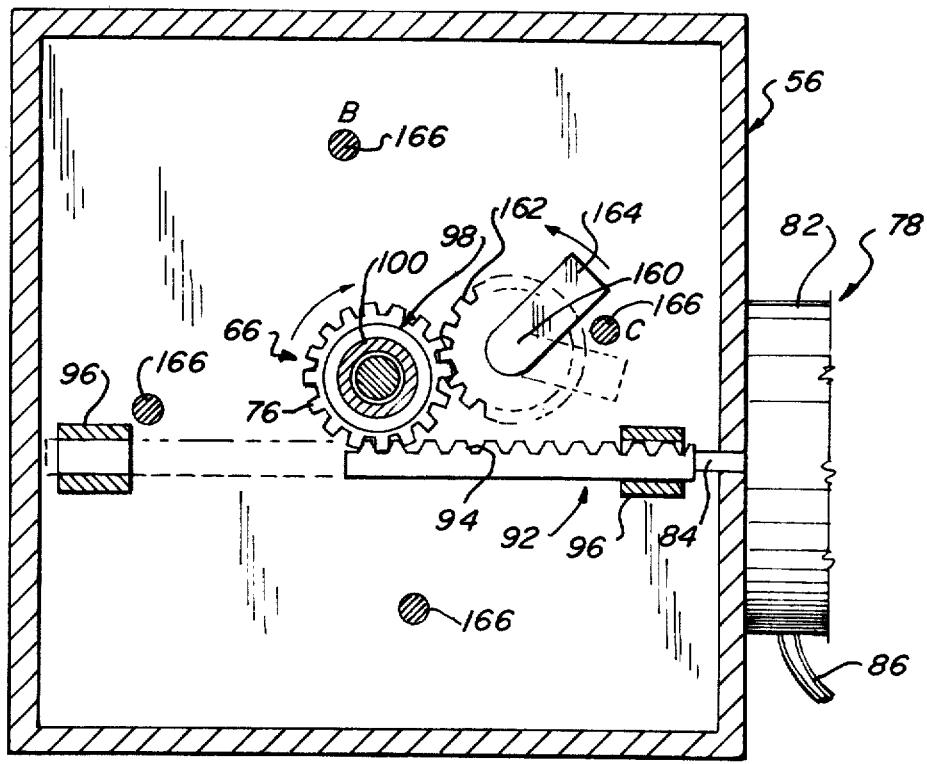
Fig_5

INDEXING TURRET

BACKGROUND OF THE INVENTION

This invention lies in the field of indexing turrets for use with machine tools of various kinds including lathes, milling machines, etc., and is directed particularly to such turrets having simple and reliable means for indexing accurately to successive indexed positions and locking the turret solidly in position against external forces.

Indexing turrets or tables have been in use for many years to increase the productive capacity of machine tools. In the case of a tool such as a lathe, the turret may carry a plurality of cutting tools of varying shapes to produce different types of cuts. Some part of the turret carrying the tools is rotatable about a reference axis to present the tools successively to the work. Each tool must be very accurately located for use and must be held very solidly in position in order to perform the proper cutting action.

The same types of mechanisms are used to control indexing tables which are basically the same as the devices referred to as turrets. The normal use of such tables is in a machine having one or more stationarily located cutting tools such as drills, reamers, and taps. The table is generally planar and horizontal and rotates about a central vertical axis and carries a plurality of fixtures spaced around a circular path lying under the cutting tools. Each fixture supports a work piece and, as the table moves to successive indexed positions, each work piece is successively machined by one of the tools. Thus, an operator can stand at a loading station and attach a raw work piece to each fixture and then remove the finished pieces as they arrive at his station after one full circuit.

Most of the devices of this type which have actually gone into use have performed their functions quite well. However they incorporate various disadvantages which make it desirable to seek an improved mechanism. A major problem is complication. The usual turret has a multitude of shafts, bearings, gears, ratchets, pawls and levers and all of them must interact very accurately in order to perform the basic function of placing a tool or work piece in the exact location desired and maintaining it there during the machining operation. Thus, the first cost is quite high. The maintenance cost is also high because the parts must be replaced, reworked, or adjusted to compensate for the slightest wear in order to maintain accuracy.

In many machines the indexed position is maintained by index pins in one part engaging sockets in a relatively movable part. It is difficult to initially align the pins with the sockets and to make their dimensions so accurate that there is no play. The pins are frequently spring loaded to index position and retracted by mechanical means. If high external forces are applied to the tools it is quite possible for the pins to yield slightly and allow misalignment of the tools. Another factor adding to complication and cost is the use of separate power means for rotating the turret and for actuating the index lock means.

SUMMARY OF THE INVENTION

The turret of the present invention overcomes the difficulties and disadvantages mentioned above and provides a simple and reliable mechanism which produces very accurate indexing and in which extremely high accuracy is required in only a few elements.

Generally stated, the turret includes a base which may be of any suitable size and shape and may be mounted in any desired attitude, but usually it is block-like an its general plane is horizontal. An indexing head, which will hold either cutting tools or fixtures for work pieces depending on the machine with which it is used, is carried by the base for rotation about a reference axis perpendicular to the general plane of the base and also for extension away from and retraction toward the base.

For this purpose, a first rotary actuator is mounted on the base for rotation about the reference axis and a lift stud in the form of a hollow shaft is connected to the actuator and the head. The first end of the stud is threaded and engages with a mating threaded formation on the acutator and it also has a sliding keyed connection with the base to permit axial motion but not rotary motion. Hence, when the actuator is rotated in its advancing direction, the non-rotating stud is extended out or up away from the base and when the actuator is rotated in the reverse or retracting direction the stud is retracted toward the base.

The second end of the stud is connected to the head for relative rotation but not for relative axial movement. Accordingly the head is extended and retracted in unison with the stud and may rotate relative to it on occasion.

A rotary drive shaft is mounted coaxially within the stud concentric with the reference axis and its first end is fixedly secured to the first rotary actuator to be rotated by it. The second end of the drive shaft is connected to the head by means of a second rotary actuator which includes a lost motion connection arranged so that it does not drive the head during the first portion of the advancing rotation of the first rotary actuator but does drive the head angularly to the next indexed position during the last portion of the advancing rotation of the first rotary actuator.

Interengaging indexing lock members are carried by the head and base to index the head to exact position and to hold it against rotation. While various types may be used, those which are now designed into the structure comprise a pair of rings arranged concentrically with the reference axis, one secured to the head and the other to the base. The rings have facing matching gear teeth which are very accurately machined and ground, and they engage each other perfectly to provide positive indexing and positive locking. These indexing rings are marketed by J. C. Furneaux Limited of Colnbrook, Bucks, England under the trade name Hirth Ring Couplings.

When the head is fully retracted the ring gears are in full engagement. When the first rotary actuator is rotated in its advancing direction it causes the head to extend, and the ring gears disengage. The lost motion connection starts rotating the head just after the disengagement and moves it to the next indexed position just as the first rotary actuator reaches the limit of its advancing rotation. It is then reversed to retract the head and cause re-engagement of the ring gears. The latter fit precisely and correct any slight error in the positioning of the head by the drive means. Since the stud is connected to the first rotary actuator by screw threads, the retraction of the stud and head is positive, and the ring gears prevent any possible misalignment resulting from external forces.

BRIEF DESCRIPTION OF THE DRAWINGS

Various other advantages and features of novelty will become apparent as the description proceeds in conjunction with the accompanying drawings, in which:

FIG. 1 is a diagrammatic plan view of a lathe on which the turret of the invention is mounted;

FIG. 2 is a diagrammatic side elevational view of a drill press in which the turret serves as a work table;

FIG. 4 is a diagrammatic sectional view in elevation taken on line 4—4 of FIG. 3;

FIG. 5 is a diagrammatic sectional view taken on line 5—5 of FIG. 4;

FIG. 6 is a diagrammatic top plan view of the head with the cover plate removed.

DESCRIPTION OF THE PREFERRED EMBODIMENTS

Figure 3:
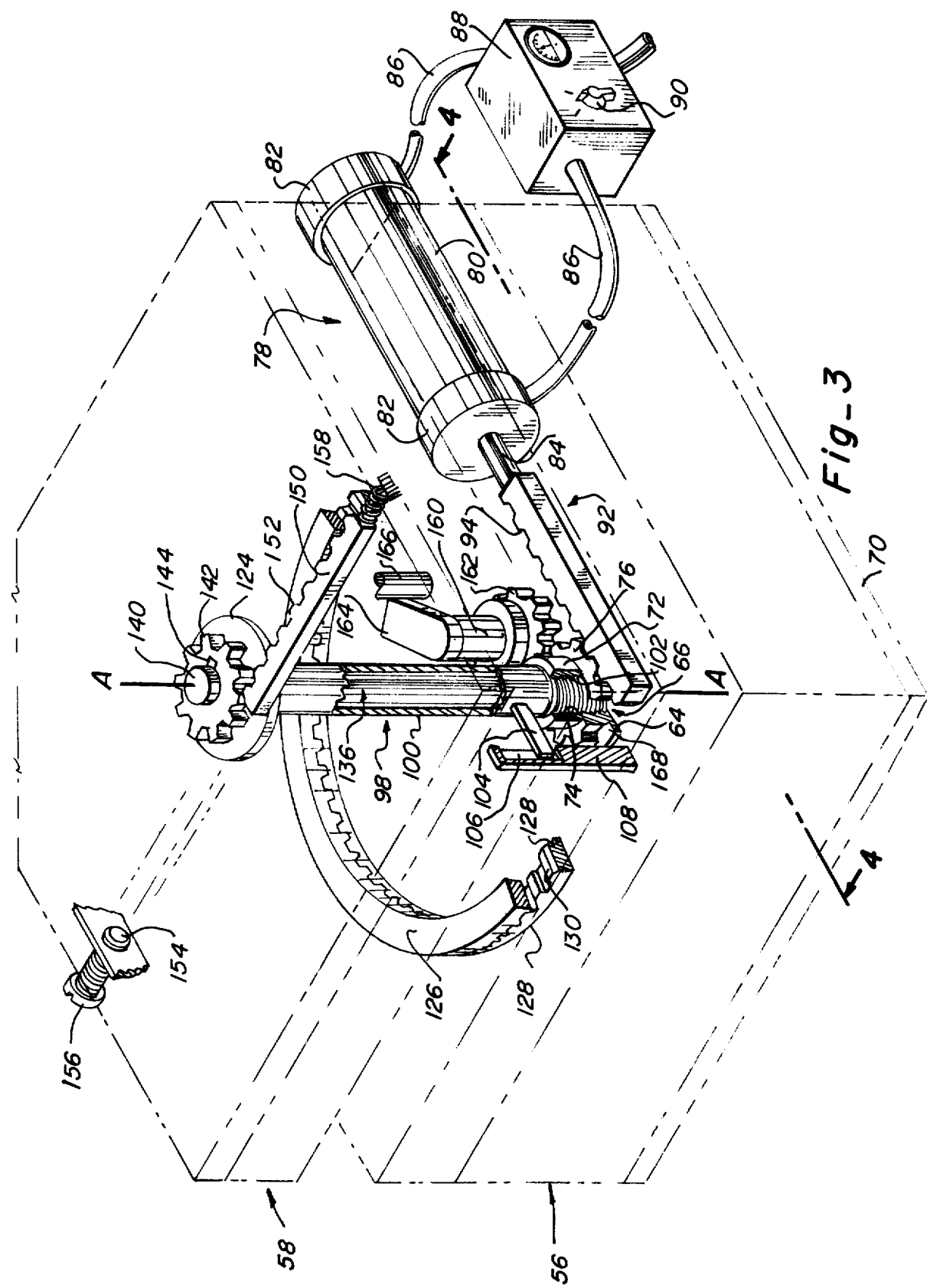
FIG. 3 is a diagrammatic perspective view of the arrangement of the working parts of the turret.

Two general types of machines with which the invention is well suited for use are very diagrammatically illustrated in FIGS. 1 and 2. The machine of FIG. 1 is a lathe having a bed 10, a head stock 12 and a tail stock 14 carrying a work piece 16 between them. Ways 18 at the front of the machine support a carriage 20 for longitudinal movement, and the carriage is provided with a cross slide 22 on which is mounted a conventional tool body provided with a cutting tool 24 to turn the surface of the work piece 16. A second set of ways 26 at the rear of the bed support carriage 28 having cross slide 30 on which is mounted turret 32 carrying four different types of tools 34. The head 36 of the turret is rotatable to four angular indexed positions to sequentially present each of the tools to the work piece and that turret is moved in and out on the cross slide to perform the appropriate machining operation.

The machine of FIG. 2 is a drill press having a main frame 38, a standard 40, a power head 42, and a drill 44. The turret includes a base 46 and a head or table 48 on which are mounted a circularly arranged series of fixtures 50, each carrying a work piece 52. There may be several drills 44 or other cutting tools carried by the power head and spaced along the path of movement of the work pieces at successive indexed positions. A servo motor 54 is connected to mechanism within the base to power the indexing operation. The operation of both machines is the same and the following description applies to both but is directed primarily to the tool turret of FIG. 1.

The general arrangement of all of the elements of turret 32 is shown in FIG. 3 with base 56 and head 58 shown in phantom lines, while FIGS. 4 5, and 6 illustrate some of the elements in more detail. Base 56 is provided with a bottom wall 60 having an annular shouldered socket 62 in which is seated the head portion 64 of a first rotary actuator 66 having a peripheral flange 68 held in position in the socket by bottom plate 70 for rotation about reference axis A—A which is perpendicular to the general plane of the base. The actuator has a neck or sleeve 72 formed with internal threads 74 and an external collar intermediate its length formed with gear teeth 76.

The operation and control of actuator 66 is effected by servo motor 78 attached to a side wall of base 56 and consisting of a cylinder 80, heads 82, a piston, not shown, and a piston rod 84 connected to the piston for reciprocating movement. Fluid conduits 86 lead from the heads to a manual control panel 88 having a valve control handle 90. For use with automatic machinery, conduits 86 may lead to a fully automatic control panel operated in accordance with a suitable machining program. The motive fluid in the servo motor system may be pressurized gas or liquid, but is preferably compressed gas to perform a function to be described later.

A first linear actuator comprises a rack 92 having teeth 94 and connected at a first end to piston rod 84 to be reciprocated thereby. The rack slides in linear guide means 96 which maintain it in a line substantially tangent to gear 76 so that teeth 94 of the rack are always in mesh with the gear 76. When the rack extends and retracts with reference to servo motor 78 it causes actuator 66 to rotate in advancing and retracting angular directions.

The connection between base 56 and head 58 is provided by lift stud 98. The lift stud comprises a hollow shaft 100 having an external thread 102 on its first end which engages in the internal thread 74 of actuator 66. By virtue of this connection shaft 100 is maintained concentric with the reference axis A—A. A key or guide pin 104 extends laterally from shaft 100 into an axially directed keyway 106 in guide post 108 which is secured to bottom wall 60. It will be seen that with this arrangement shaft 100 is prevented from rotating about axis A—A but is free to move in the direction of the axis while at the same time the engagement of threads 102 with threads 74 causes the shaft 100 to extend and retract away from and toward the base in response to advancing and retracting rotation of actuator 66.

Head 58 may be constructed in various ways which are suitable for the purpose but is shown here for example only as comprising a main body 110 and a cover plate 112. The broken line circles 114 in FIG. 4 schematically illustrate two of the four tool support bores which extend entirely through the head as seen in FIG. 1. This arrangement permits the mounting of up to four tools at one time in the head. Since each transverse bore is offset from axis A—A the same distance, each tool will be sequentially brought into proper alignment with the workpiece so that four operations can be performed with one setup. Also, this arrangement of bores makes the practice of having to cut off the tool stock unnecessary, since it can extend clear through the head, if necessary, by omitting one of the other tools. This is particularly important for internal diameter tooling. Body 110 is formed with a cylindrical recess or pocket 116 and a passage 118 concentric with axis A—A, and cover plate 112 is also formed with a pocket 120 and a passage 122 concentric with axis A—A. The upper or second end of shaft 100 is provided with a peripheral flange 124 which is seated for rotation in pocket 116. Since pocket 120 in the cover plate is smaller in diameter than pocket 116, a portion of the cover plate overlies flange 124 and prevents axial movement relative to the head. Consequently, when actuator 66 causes the lift stud to extend and retract, head 58 extends and retracts in unison with the stud.

While the various types of interengaging indexing lock members may be used, such as pins and sockets, ratchets, etc., maximum accuracy is achieved by the use of ring gear type locks such as the Hirth Ring Couplings previously described. As best seen in FIGS. 3 and 4, they comprise upper and lower rings 126 and 128 which are identical in size and shape and are mounted concentrically with axis A—A. Each ring has a plurality of radially directed gear teeth 130 on their confronting faces, the teeth having sloping sides which serve to adjust them angularly into exact indexed engagement. Ring 126 is secured to a lower annular flat face 132 of body 110, and ring 128 is secured to an upper annular inwardly directed flat face 134 on base 56. When the head and stud are fully retracted, the rings are in very tight, very accurately indexed engagement and the threaded connection positively holds the head retracted so that rotation is prevented. When actuator 66 is rotated in its advancing direction, the first portion of its rotation extends the stud and head sufficiently to fully disengage teeth 130 so that the head may be rotated.

A rotary drive shaft 136 is mounted coaxially within hollow shaft 100 and its first end 138 is fixedly secured to actuator 66. Its second end 140 extends through head 58 and terminates approximately at the upper surface of cover plate 112. A second rotary actuator in the form of pinion 142 is seated in pocket 120 in the cover plate and is formed with keyways 144 to accommodate relative axial movement of key 146 carried by end 140. With this arrangement, the pinion may extend and retract with the head while being positively rotated by drive shaft 136.

In addition to pocket 120, cover plate 112 is also formed with an elongate linear guide track 148 tangent to pocket 120. A second linear actuator in the form of rack 150 is seated in the guide track, and its teeth 152 are adapted to mesh with pinion 142 to be driven thereby along the track. The rack is approximately one half the length of the track and has a retracted position in the second portion of the track, as shown in FIG. 6. A stop member 154 is located at the first end of the track and may be adjusted by screw 156 to engage the rack at a selected point.

When pinion 142 is rotated in an advancing direction by rotation of actuator 66, it drives rack 150 forward until it contacts stop member 154. This represent about one half or less of the total rotation of actuator 66 and pinion 142. During this phase the head has extended sufficiently to clear the lock rings 126 and 128 from each other but the lost motion movement of rack 150 has not applied any turning force to the head. However, when the rack contacts stop member 154, continued rotation of pinion 142 through the remainder of its angular range drives the rack, the stop member, and the head angularly to the next indexed position, as indicated by the arrows and broken lines of FIG. 6. This new position corresponds with the maximum stroke of the piston of the servo motor.

As soon as the new indexed position is reached, the operator adjusts handle 90 to cause retraction of the piston in the cylinder 80. This reverses the rotation of actuator 66 and pinion 142 and retracts the head to re-engage rings 126 and 128. If there is a slight angular misadjustment of the head, the sloping faces of the gear teeth 130 will correct it as they complete their meshing action. In the first portion of the retraction movement, pinion 142 will rotate in the reverse direction to move rack 152 back toward its retracted position. If it made positive contact with the second end of the guide track it would apply a reverse rotational force to the head in opposition to the locking action of rings 126 and 128. However a weak compression spring 158 is mounted in the second end of the track. The length of the rack is so chosen that it contacts the spring just as the teeth of pinion 142 engage the rack. Continued rotation of the pinion in this direction pushes the rack against the yielding spring and repeatedly ratchets it in this manner until completion of its rotation. Thus, the entire retracting rotation of the pinion is accomplished without exerting any appreciable force against the head.

It will be apparent that basically the full stroke of the piston determines the sequential indexed positions of the head. It is desirable to provide a more positive control over the degree of movement of the head and also to cushion the shock of sudden stoppage of the head at the desired point. For this purpose a cyclic stopping system is provided. A support shaft 160 is mounted in bottom wall 60 for rotation about an axis A—A. Pinion 162 is fixedly mounted on the support shaft in engagement with gear 76 on the actuator 66, and stop pin 164 extends laterally from the free end of the support shaft. A plurality of index pin detents 166, equal in number to the number of predetermined indexed positions, are secured to the head and extend toward the base, as best seen in FIG. 4. At the beginning of an indexing operation, the support shaft is so positioned that stop-pin 164 extends in the direction shown in FIG. 5. When gear 76 rotates in the advancing direction, clockwise as viewed in FIG. 5, it causes pinion 162 to rotate counter clockwise and swing stop pin 164 around to the broken line position. During this period one of the detents 166 has moved from position B to position C. Thus it strikes pin 164 just as it reaches the point corresponding to the next indexed position of the head. The contact produces a relatively high impact force because of the inertia of the head. This force is transmitted back through the elements comprising the drive chain to the compressed gas motive fluid in the cylinder, causing the latter to serve as a shock absorber.

It will be apparent that the device of the present invention provides a turret with a relatively small number of parts which require a lower degree of precision because of the extreme accuracy of the indexing rings and in which a single power source serves the triple purpose of indexing, locking, and acting as a shock absorber.

What is claimed is:

1. An indexing turret for use in combination with a machine tool, comprising:
   a supporting base having a reference axis perpendicular to the general plane of the base;
   an indexing head carrier by the base and mounted for linear retraction and extension toward and away from the base in the direction of the reference axis and for rotational movement about the reference axis to a plurality of indexed positions;
   a first rotary actuator mounted on the base for rotation about the reference axis;
   a first linear actuator connected to the first rotary actuator and mounted for reciprocating movement parallel to the general plane of the base to cause rotation of the rotary actuator in advancing and retracting directions through a predetermined angular range;

a reciprocating action servo motor connected to the first linear actuator;

a lift stud extending between the head and the base concentrically of the reference axis and slidably connected to the base for axial, non-rotary movement;

the stud having a first end threadedly connected to the first rotary actuator to be axially extended and retracted in response to advancing and retracting rotation of the actuator;

the stud having a second end connected to the head for rotary, non-axial relative movement to cause the head to extend and retract in unison with the stud;

interengaging indexing lock members connected to the head and base to lock the head in selected indexed positions and adapted to disengage upon extension of the head away from the base to allow rotation of the head;

a rotary drive shaft connected to a first end to the first rotary actuator to be rotated thereby;

and a second rotary actuator connected to the second end of the drive shaft to engage the head and rotate it through a predetermined angular distance to a succeeding indexed position;

the head being retractable toward the base in response to retracting rotation of the first rotary actuator to re-engage the indexing lock members and positively retain the head in its indexed position during a machining operation.

2. A turret as claimed in claim 1; in which a lost motion connection is provided between the second rotary actuator and the head to delay application of rotational force to the head during the first portion of the extension of the lift stud and head and the disengagement of the indexing lock members.

3. A turret as claimed in claim 1; in which the second rotary actuator comprises a pinion connected to the second end of the drive shaft and rotatable therewith;

a linear guide track is formed in the head substantially tangent to the periphery of the pinion;

a stop member is located at a first end of the track;

a second linear actuator in the form of a rack considerably shorter than the track is seated in the track for sliding movement and has a retracted position in the second portion of the track;

and the rack is engageable by the pinion to advance freely toward the stop member during the first portion of the advancing rotation of the pinion, and to engage the stop and force rotation of the head during the second portion of the advancing rotation of the pinion.

4. A turret as claimed in claim 3; in which a compression spring is located at the second end of the track;

the rack is retracted to the second portion of the track during the first portion of the retracting rotation of the pinion and into contact with the spring;

and the pinion during the final portion of its retracting rotation repeatedly ratchets the rack against the spring to obviate dislocation of the head from its indexed position.

5. A turret as claimed in claim 3; in which the pinion is rotatably mounted in the head to extend and retract with respect to the drive shaft and is connected to the second end of the drive shaft by a sliding key formation.

6. A turret as claimed in claim 1; in which the rotary drive shaft is coaxial with the reference axis and is fixedly connected to the first rotary actuator;

the lift stud is a hollow shaft surrounding the drive shaft;

and the connection between the lift stud and the head comprises a peripheral flange at the second end of the stud and a correspondingly shaped pocket in the head.

7. A turret as claimed in claim 1; in which the first rotary actuator is formed with peripheral gear teeth;

and the first linear actuator is a rack mounted for axial sliding in linear guide means to travel substantially tangent to the gear teeth, with the rack engaging the gear teeth to cause advancing and retracting rotation of the rotary actuator.

8. A turret as claimed in claim 1; in which a plurality of index pin detents, equal in number to the number of predetermined indexed positions, are secured to the head and extend toward the base;

a stop pin is movably mounted on the base and has a normal retracted position out of the path of travel of the detents;

and force transmitting means extends between the first rotary actuator and the stop pin to move it into the path of travel of the detents at the end of the advancing rotation of the rotary actuator and engage the confronting detent to stop the rotational movement of the head at the desired indexed position.

9. A turret as claimed in claim 8; in which the first rotary actuator is formed with peripheral gear teeth;

the force transmitting means includes a support shaft rotatably mounted on the base on an axis parallel to the reference axis;

a pinion is fixedly mounted on the support shaft in engagement with the gear teeth on the rotary actuator, and the stop pin extends laterally from the free end of the support shaft;

and rotation of the actuator causes the pinion and support shaft to turn in the opposite angular direction and swing the stop pin into interference position at the end of the advancing rotation of the actuator.

10. A turret as claimed in claim 9; in which the first linear actuator is a rack mounted for axial sliding in linear guide means to travel substantially tangent to the gear teeth on the first rotary actuator, with the rack engaging the gear teeth to cause advancing and retracting rotation of the rotary actuator;

the servo motor comprises a cylinder, piston actuated by compressed gas motive fluid in the cylinder, and a piston rod connected to the first linear actuator;

and contact of each successive confronting detent with the stop pin produces an impact force transmitted back through the elements comprising the drive chain to the compressed gas motive fluid in the cylinder to cause the latter to serve as a shock absorber.

11. An indexing turret for use in combination with a machine tool, comprising:
- a supporting base having a reference axis perpendicular to the general plane of the base;
- a rotary actuator mounted on the base for advancing and retracting rotation about the reference axis through a predetermined angular range;
- a lift stud arranged concentric with the reference axis and having a first end slidably connected to the base for axial, non-rotary extending and retracting movement and also connected to the rotary actuator for relative rotation, the connection including positive interengaging means to extend and retract the stud in response to advancing and retracting rotation of the actuator;
- an indexing head coaxially mounted on the second end of the lift stud for rotary, non-axial movement with respect thereto;
- interengaging indexing lock members connected to the head and base to lock the head in selected indexed positions when the head is retracted and adapted to disengage upon extension of the head away from the base to allow rotation of the head;
- and force transmitting means extending between the actuator and the head to cause rotation of the head in response to the final portion of the advancing rotation of the actuator after extension of the lift stud to disengage the indexing lock members;
- the full retracting rotation of the rotary actuator serving to retract the indexing lock members into positive engagement to resist any external rotational forces applied to the head.

12. A turret as claimed in claim 11; in which
said indexing head includes a plurality of transverse bores extending entirely through said head for receiving a plurality of tools.

13. A turret as claimed in claim 11; in which
said indexing head includes a first pair of parallel bores extending through said head on opposite sides of said lifting stud;

and a second pair of parallel bores extending through said head on opposite sides of said lifting stud and transverse to and intersecting with said first pair of bores.

* * * * *